(12) United States Patent
Nagahiro

(10) Patent No.: US 6,812,975 B2
(45) Date of Patent: Nov. 2, 2004

(54) ACTIVE MATRIX TYPE DISPLAY

(75) Inventor: Yoshio Nagahiro, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 09/551,362

(22) Filed: Apr. 18, 2000

(65) Prior Publication Data
US 2003/0071930 A1 Apr. 17, 2003

(30) Foreign Application Priority Data

May 24, 1999 (JP) .......................................... 11-142627

(51) Int. Cl.[7] .......................................... G02F 1/1343
(52) U.S. Cl. .......................................... 349/39; 349/38
(58) Field of Search .......................... 349/38, 39, 42, 349/43, 44

(56) References Cited

U.S. PATENT DOCUMENTS

| | | | | |
|---|---|---|---|---|
| 5,182,661 A | * | 1/1993 | Ikeda et al. .................... | 359/54 |
| 5,317,432 A | * | 5/1994 | Ino .............................. | 359/59 |
| 5,917,563 A | * | 6/1999 | Matsushima .................. | 349/38 |
| 5,942,310 A | * | 8/1999 | Moon .......................... | 428/195 |
| 6,088,071 A | * | 7/2000 | Yamamoto et al. ........... | 349/38 |
| 6,137,551 A | * | 10/2000 | Jeong .......................... | 349/38 |
| 6,172,721 B1 | * | 1/2001 | Murade et al. ............... | 349/43 |
| 6,317,173 B1 | * | 11/2001 | Jung et al. .................... | 349/42 |

* cited by examiner

Primary Examiner—Robert H. Kim
Assistant Examiner—David Y. Chung
(74) Attorney, Agent, or Firm—Greer, Burns & Crain, Ltd.

(57) ABSTRACT

The present invention relates to an active matrix type display providing a thin film transistor (TFT) as a switching device and which can obtain a large storage capacitor without thinning an insulating film between electrodes or expanding an electrode to a pixel area. The active matrix type display is structured to have a plurality of gate wirings formed on a glass substrate, a plurality of data wirings formed on the glass substrate substantially orthogonal to the gate wirings, the TFT decided by the gate wirings and data wirings and formed in a plurality of pixel areas arranged in a matrix shape, a pixel electrode formed inside the pixel area and connected to the TFT, and a plurality of storage capacitor electrodes layers formed a plurality of storage capacitors between the glass substrate and pixel electrode via a plurality of insulating films.

5 Claims, 7 Drawing Sheets (a)

(b)

(a)

(b)

(c)

(d)

(a)

(b)

(a)

(b)

(c)

(a)

(b)

(a)

(b)

ACTIVE MATRIX TYPE DISPLAY

BACKGROUND OF THE INVENTION

1. Field of the Invention

The present invention relates to an active matrix type display provided with a thin film transistor (hereinafter, referred to as a TFT) as a switching device and more particularly to liquid crystal display (hereinafter, referred to as a LCD) which displays an image by driving liquid crystal according to the TFT.

2. Description of the Related Art

A thin film transistor array using amorphous silicon or polycrystal silicon (polysilicon) as an operational semiconductor film is used as a switching device for an active matrix type liquid crystal display panel and the like.

FIG. 6 shows a schematic structure of an array substrate for the conventional liquid crystal display panel using the TFT. FIG. 6(a) shows a plan view of the array substrate and FIG. 6(b) shows a part of a cross section cut at a line A—A in FIG. 6(a). As shown in FIG. 6(a), a plurality of gate wirings 4 are formed on a glass substrate 1. Further, a plurality of data wirings 6 are formed in the orthogonal direction to the gate wirings 4. The TFT is formed in a pixel area decided by the gate wirings 4 and the data wirings 6. According to a structure of the TFT shown in FIG. 6, a gate electrode is not formed by being pulled out of the gate wiring 4, and the TFT is structured to use a part of the gate wiring 4 wired lineally as the gate electrode. Furthermore, this TFT has the so-called double gate structure in which the gate wiring 4 is crossed twice.

In the pixel area, a pixel electrode 7 to be connected to the TFT is formed. Further, a storage capacitor wiring 41 is formed by crossing the pixel area in parallel with the gate wirings 4 and furthermore, a storage capacitor electrode 62 to be electrically connected to the storage capacitor wiring 41 at each pixel area is formed.

Furthermore, as shown in FIG. 6(b), a semiconductor layer 2 made of polysilicon is formed on the glass substrate 1, and a gate insulating film 3 made of silicon oxide film ($SiO_2$) and a gate electrode (gate wiring) 4 made of chrome (Cr) are formed in this order on the semiconductor layer 2. The semiconductor layer 2 has a channel layer 2a, a source electrode 2c and a drain electrode 2b which are semiconductor layers to which impurity is doped. A first interlayer insulating film 51 is formed substantially on the whole surface of the upper layer of the gate electrode 4, and a drain electrode 2f is connected to the data wiring 6 via a contact hole 51a (refer to FIG. 6(a)). A source electrode 2e is arranged opposing to the drain electrode 2f sandwiching a channel layer 2g. The source electrode 2e functions as the drain electrode 2b in a transistor at next stage. The source electrode 2c is arranged opposing to the drain electrode 2b while sandwiching the channel layer 2a. Also, the source electrode 2c and an island-like electrode 61 are connected via a contact hole 51b. The island-like electrode 61 is formed simultaneously with a formation of the data wiring 6 made of, for example, Mo (Molybdenum). The island-like electrode 61 is connected to the pixel electrode 7 made of a transparent electrode such as ITO (Indium Tin Oxide) via a contact hole 52c in a second interlayer insulating film 52 formed above the island-like electrode 61.

On the other hand, simultaneously with the formation of the gate electrode 4, the storage capacitor wiring 41 is formed in parallel with the gate electrode 4. A storage capacitor electrode 62 is formed on the storage capacitor wiring 41 via a contact hole 51d in the first interlayer insulating film 51. The storage capacitor electrode 62 is formed simultaneously with the formation of the data wiring 6. The storage capacitor electrode 62 forms a storage capacitor Cs between the pixel electrode 7 and the storage capacitor electrode 62 sandwiching the second interlayer insulating film 52. It will be noted that, in order to maintain a constant potential, for example, the storage capacitor wiring 41 is electrically connected to a common electrode formed on the opposing substrate side arranged to face the glass substrate 1. Liquid crystal is sealed between the array substrate where the pixel is formed on the glass substrate and the opposing substrate. When the TFT writes electric charges in a liquid crystal capacitor via the pixel electrode 7 to display an image, the TFT simultaneously writes the electric charges in the storage capacitor. In general, the capacitance which is substantially from the same as the capacitance of liquid crystal to several times as much as the capacitance of liquid crystal is required for the storage capacitor.

FIG. 7 shows other structure of the array substrate for the conventional liquid crystal display panel using the TFT. FIG. 7(a) shows a plan view of the array substrate and FIG. 7(b) shows a part of a cross section cut at a line B—B in FIG. 7(a). As shown in FIG. 7(a), a plurality of gate wirings 4 are formed on the glass substrate 1. Further, a plurality of data wirings 6 are formed in the orthogonal direction to the gate wirings 4. The TFT is formed in the pixel area decided by the gate wirings 4 and the data wirings 6. According to the structure of the TFT shown in FIG. 7, a gate electrode is not formed by being pulled out of the gate wiring 4, and the structure of the TFT is structured to use a part of the gate wiring 4 wired lineally as the gate electrode. Furthermore, this TFT has the so-called double gate structure in which the gate wiring 4 is crossed twice.

In the pixel area, the pixel electrode 7 to be connected to the TFT is formed. Further, a storage capacitor electrode 8 is formed surrounding the circumference of the pixel electrode 7. This storage capacitor electrode 8 also serves as a black matrix layer (black matrix) normally formed on the opposing substrate side facing the array substrate where the TFT is formed sandwiching a liquid crystal layer.

Furthermore, as shown in FIG. 7(b), the semiconductor layer 2 made of polysilicon is formed on the glass substrate 1, and the gate insulating film 3 made of silicon oxide film and the gate electrode (gate wiring) 4 made of Cr are formed on the semiconductor layer 2. The semiconductor layer 2 has a channel layer 2a, and a source electrode 2c and a drain electrode 2b which are semiconductor layers to which impurity is doped. The first interlayer insulating film 51 is formed substantially on the whole surface of the upper layer of the gate electrode 4, and a drain electrode 2f is connected to the data wiring 6 via a contact hole 51a (refer to FIG. 7(a)). A source electrode 2e is arranged opposing to the drain electrode 2f sandwiching a channel layer 2g. The source electrode 2e functions as a drain electrode 2b in a transistor at next stage. The source electrode 2c is arranged opposing to the drain electrode 2b sandwiching the channel layer 2a. Also, the source electrode 2c and the island-like electrode 61 are connected via the contact hole 51b. The island-like electrode 61 is made of, for example, Mo and formed simultaneously with the formation of the data wiring 6. The island-like electrode 61 is connected to the pixel electrode 7 made of a transparent electrode such as ITO via a contact hole 53c opened in the second interlayer insulating film 52 and a third interlayer insulating film 53 formed above the island-like electrode 61.

The storage capacitor electrode 8 made of, for example, titanium is formed between the second interlayer insulating film 52 and the third interlayer insulating film 53. The storage capacitor electrode 8 which also serves as the black matrix layer forms a storage capacitor Cs between the pixel electrode 7 and the storage capacitor electrode 8 sandwiching the third interlayer insulating film 53. Further, the storage capacitor electrode 8 is connected to, for example, the common electrode in order to maintain the constant potential.

In order to increase storage capacity in the display described above, methods such as increasing a relative dielectric constant of an insulating film between electrodes, decreasing the thickness of the insulating film, or increasing the area of a storage capacitor electrode are generally considered. However, there is problems that in the method of increasing the relative dielectric constant of the insulating film, a material for the insulating film is limited, and in the method of decreasing the thickness of the insulating film, an occurrence of an interlayer short-circuit between electrodes is concerned.

Further, though the display is desired to display as high as possible in brightness, in the method of increasing an electrode area, the area of the storage capacitor electrode formed by a metal material which does not pass the light extends inside the pixel electrode 7 and much of transmitting light from the back lighting is shielded at the storage capacitor electrode. Therefore, when obtaining a bright display panel with high aperture ratio by increasing the area on which the back lighting light is incident, a problem exists where the storage capacitor can not be increased.

SUMMARY OF THE INVENTION

An object of the present invention is to provide an active matrix type display from which a large storage capacity can be obtained without thinning an insulating layer between electrodes nor expanding the electrode to a pixel area.

Above object is achieved by an active matrix type display comprising a plurality of gate wirings formed on a substrate, a plurality of data wirings formed on the substrate substantially orthogonal to the gate wirings, a thin film transistor formed in a plurality of pixel areas decided by the gate wirings and the data wirings and arranged in a matrix shape, a pixel electrode formed in the pixel area and connected to the thin film transistor, and a plurality of storage capacitor electrodes forming a plurality of storage capacitors between the substrate, the pixel electrode and the storage capacitor electrodes via a plurality of insulating films.

According to the present invention, by laminating storage capacitors to structure a plurality of layers, capacity can be increased without generating an increase of a shielding area which reduces the aperture ratio of the pixel.

Further, in addition to the conventional storage capacitor, by laminating storage capacitors to a plurality of layered structures in the area where a conventional storage capacitor electrode originally shields a light, storage capacity can be increased without reducing the aperture ratio of the pixel. It will be noted that, the active matrix type display according to the present invention uses the same device forming materials as in the conventional display and can be fabricated by the same fabrication method as before.

BRIEF DESCRIPTION OF THE DRAWINGS

The present invention is further described in connection with the accompanying drawings, in which.

DESCRIPTION OF THE PREFERRED EMBODIMENTS

Figure 1:
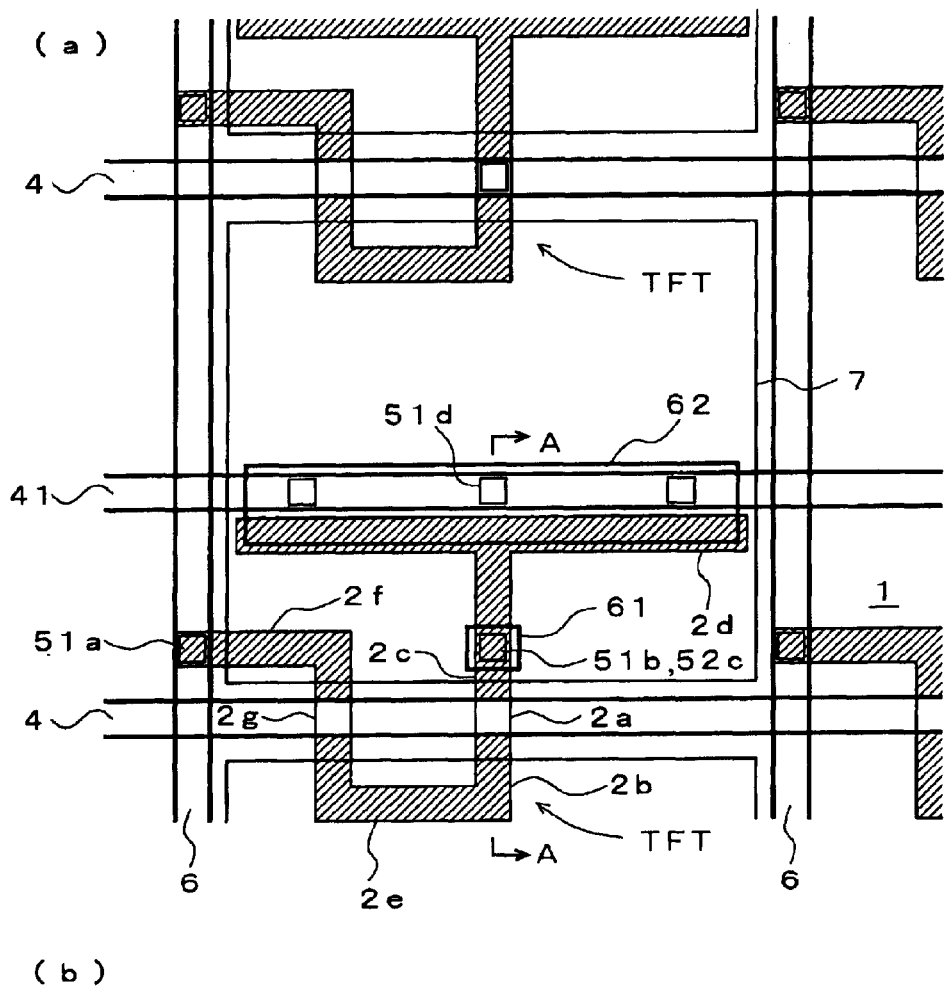
FIG. 1 is a diagram showing a structure of an active matrix type display according to a first embodiment of the present invention.
Figure 1:
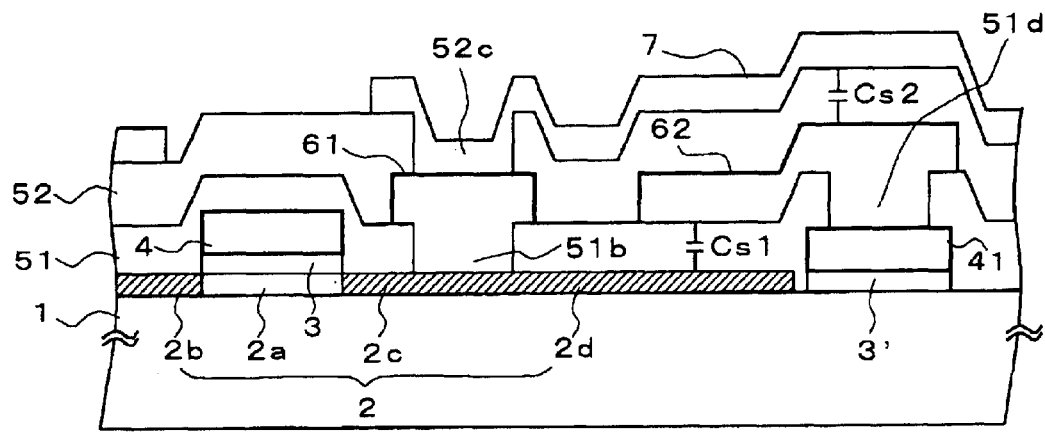
Figure 2:
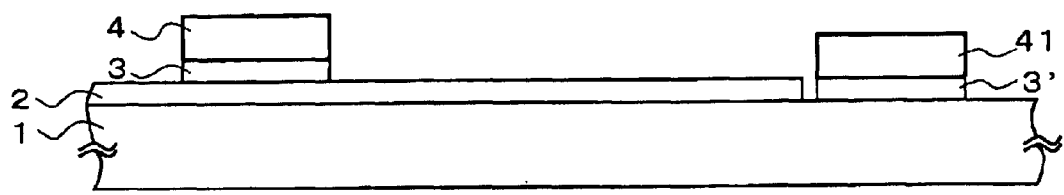
FIG. 2 is a diagram showing a fabrication method of the active matrix type display according to the first embodiment of the present invention.
Figure 2:
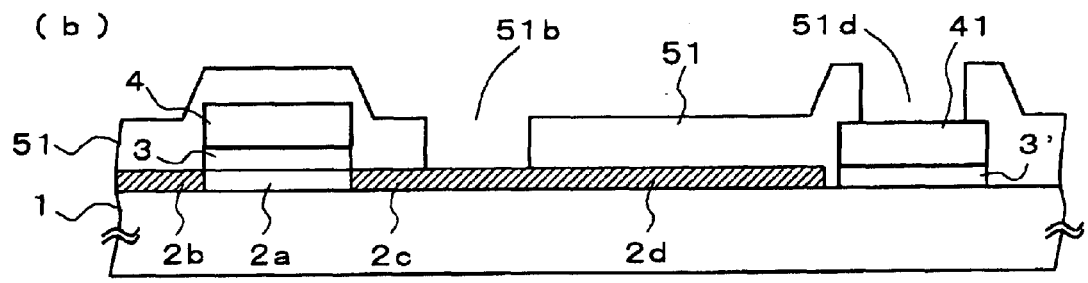
Figure 2:
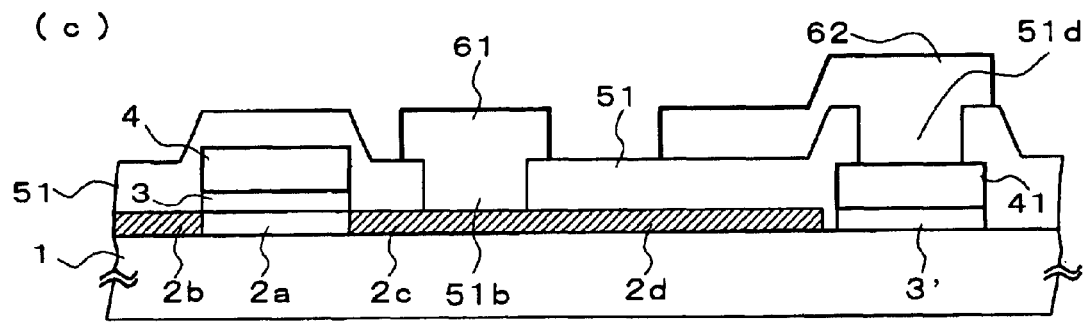
Figure 2:
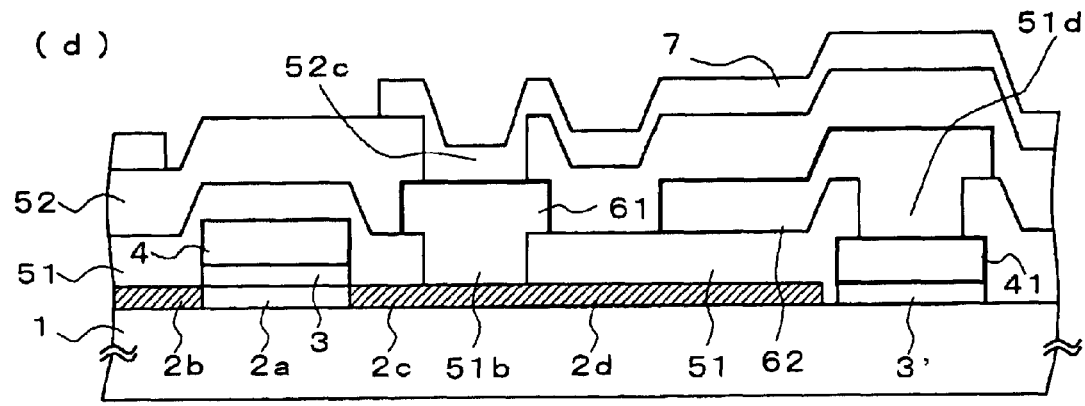

An active matrix type display according to a first embodiment of the present invention is described with reference to FIG. 1 through FIG. 3. First, a schematic structure of the active matrix type display according to this embodiment is described with reference to FIG. 1. FIG. 1(*a*) shows a plan view of an array substrate and FIG. 1(*b*) shows a part of a cross section cut at a line A—A in FIG. 1(*a*). As shown in FIG. 1(*a*), on a substrate made of transparent glass, which is to be the array substrate, a plurality of gate wirings 4 extending in the lateral direction in the diagram are formed in line in parallel. Further, a plurality of data wirings 6 are formed in line in parallel substantially in the orthogonal direction to the gate wirings 4.

A rectangular-shape area decided by each gate wiring 4 and each data wiring 6 becomes a pixel area and a plurality of the pixel areas are arranged in a matrix shape. In each pixel area, TFT is formed. According to a structure of the TFT shown in FIG. 1, a gate electrode is not formed by being pulled out of the gate wiring 4, the TFT is structured to use a part of the gate wiring 4 wired lineally as the gate electrode. Further, in order to make a reduction in leak current, this TFT has the so-called double gate structure in which the gate wiring 4 is crossed twice. Thus, a drain electrode 2*f* is connected with the data wiring 6 at a contact hole 51*a*. A source electrode 2*e* is arranged opposing to the drain electrode 2*f* sandwiching a channel layer 2*g*. The source electrode 2*e* functions as a drain electrode 2*b* in a transistor at next stage. A source electrode 2*c* is arranged opposing to the drain electrode 2*b* sandwiching a channel layer 2*a*.

In the pixel area, a pixel electrode 7 which has substantially the same outward shape as an outline of the pixel area is formed. The pixel electrode 7 is connected with the source electrode 2*c* of the TFT at the contact holes 51*b* and 52*c*. Further, a storage capacitor wiring 41 which crosses inside the pixel area in parallel with the gate wiring 4 is formed. Furthermore, for example, a rectangular-shape storage capacitor electrode (hereinafter, referred to as a second storage capacitor electrode) 62 which is electrically connected to the storage capacitor wiring 41 via a contact hole 51*d* at each pixel area is formed. Also, in this embodiment, an impurity semiconductor layer composing the source electrode 2*c* is formed extending to the lower part of the second storage capacitor electrode 62. Further, the impurity semiconductor layer is formed at the lower part of the second storage capacitor electrode 62 along the storage capacitor wiring 41, thereby functioning as a first storage capacitor electrode 2d.

Description in more detail follows with reference to a device cross section shown in FIG. 1(b). A semiconductor layer 2 made of, for example, polysilicon is formed on the transparent glass substrate 1 and a gate insulating film 3 made of, for example, a silicon oxide film and the gate electrode (gate wiring) 4 made of, for example, Cr are formed on the semiconductor layer 2. The semiconductor layer 2 functions as channel layers 2a and 2g, source electrodes 2c and 2e which are impurity semiconductor layers and drain electrodes 2b and 2f. Further, a first interlayer insulating film 51 is formed on the first storage capacitor electrode 2d which extends to the lower part of the second storage capacitor electrode 62. The source electrode 2c is connected to an island-like electrode 61 simultaneously formed with the formation of the data wiring 6 via the contact hole 51b. The island-like electrode 61 is made of the same material composing the data wiring 6, for example, Mo. The island-like electrode 61 is connected to the pixel electrode 7 made of a transparent electrode such as ITO via the contact hole 52c at the second interlayer insulating film 52 formed thereabove.

In this manner, the TFT according to this embodiment has the channel layer (an operating semiconductor layer) 2a formed on the glass substrate 1, the gate insulating film 3 formed on the operating semiconductor layer 2a, the gate electrode 4 to be connected to the gate wiring 4 formed on the gate insulating film 3, the source electrode (the first semiconductor layer) 2c including impurity formed at both sides of the operating semiconductor layer 2a, and the drain electrode (a second semiconductor layer) 2b. The source electrode 2c is electrically connected to the pixel electrode 7 via the contact hole 51b opened in the first interlayer insulating film 51 and the contact hole 52c opened in the second interlayer insulating film 52 formed thereabove. The drain electrode 2f is connected to the data wiring 6 via the contact hole 51a. Therefore, the TFT has a planer-type structure.

On the other hand, the storage capacitor wiring 41 is formed in parallel with the gate electrode 4 simultaneously with the formation of the gate electrode 4. The second storage capacitor electrode 62 is formed on the storage capacitor wiring 41 via the contact hole 51d at the first interlayer insulating film 51. The second storage capacitor electrode 62 is simultaneously formed when the data wiring 6 is formed. The storage capacitor electrode 62 forms a storage capacitor Cs2 between the pixel electrode 7 and the storage capacitor electrode 62 sandwiching the second interlayer insulating film 52. Further, the second storage capacitor electrode 62 forms a storage capacitor Cs1 between the first storage capacitor electrode 2d and the second storage capacitor electrode 62 sandwiching the first interlayer insulating film 51. It will be noted that, in order to maintain a predetermined potential, the storage capacitor wiring 41, for example, is electrically connected to a common electrode formed on an opposing substrate arranged to face the glass substrate 1 and is maintained at a common potential. Liquid crystal (not shown) is sealed between the array substrate in which the pixel is formed on the glass substrate 1 and the opposing substrate (not shown). When the TFT writes electric charges to display an image in a liquid crystal capacitor via the pixel electrode 7, the electric charge are simultaneously written in the storage capacitor.

Since the first storage capacitor electrode 2d and the pixel electrode 7 are connected via the contact holes 51b and 52c, the storage capacitors Cs1 and Cs2 are connected in parallel. Thus, a whole storage capacitance is equal to Cs1+Cs2.

In this manner, a distinctive feature is that this embodiment has a plurality of gate wirings 4 formed on the glass substrate 1, a plurality of data wirings 6 formed on the glass substrate 1 substantially in the orthogonal direction to the gate wirings 4, the TFT formed in a plurality of pixel areas which are decided by the gate wiring 4 and the data wiring 6 and arranged in a matrix pattern, the pixel electrode 7 formed in the pixel area and connected to the TFT, and a plurality of the storage capacitor electrode layers (2d, 62) forming a plurality of storage capacitors Cs1 and Cs2 via a plurality of insulating films (51, 52) between the glass substrate 1 and the pixel electrode 7. Also, a distinctive feature is that a plurality of storage capacitors Cs1 and Cs2 are connected in parallel.

Further, a plurality of the storage capacitor electrodes 2d and 62 are laminated to overlap via the first interlayer insulating film when observing from a direction perpendicular to the substrate. In other words, a plurality of the storage capacitor electrodes 2d and 62 use the area where the first semiconductor layer is extended as the first storage capacitor electrode 2d and have the second storage capacitor electrode 62 which is formed between the first interlayer insulating film 51 and the second interlayer insulating film 52 and connected to the storage capacitor wiring 41 which is maintained at a predetermined potential. At least the first storage capacitor Cs1 is composed of the first storage capacitor electrode 2d, the first interlayer insulating film 51 and the second storage capacitor electrode layer 62 while the second storage capacitor Cs2 is composed of the second storage capacitor electrode 62, the second interlayer insulating film 52 and the pixel electrode 7. In this manner, by laminating the storage capacitor to a two-layer structure of Cs1 and Cs2, the capacitance can be increased without producing an increase in a shielding area which reduces an aperture ratio of the pixel.

Next, a fabrication method of the active matrix type display according to this embodiment is described with reference to FIG. 2. FIG. 2 is a cross sectional view showing a process to form the same area as the cross section shown in FIG. 1(b).

First, as shown in FIG. 2(a), the semiconductor layer 2 made of, for example, polysilicon is formed to approximately 40 nm in thickness. This semiconductor layer 2 is formed to an area where the source electrode 2c side is extended and becomes the first storage capacitor electrode 2d in later processes. Next, for example, $SiO_2$ is deposited to approximately 100 nm in thickness on a whole surface and then, for example, Cr is deposited to 200 nm in thickness and patterned, thereby forming the gate insulating film 3 and an insulating film 3' as well as the gate electrode 4 on the gate insulating film 3 and the storage capacitor wiring 41 on the insulating film 3'.

Next, as shown in FIG. 2(b), implantation of impurity is performed by using the gate electrode 4 as a mask, thereby forming the source electrode 2c and the drain electrode 2b by a self-alignment. At this time, the first storage capacitor electrode 2d is formed at the impurity semiconductor layer extending to the source electrode 2c side. Then, the first interlayer insulating film 51 is formed by depositing, for example, silicon nitride film (SiN) to, for example, 300 nm in thickness. After that, the contact holes 51b and 51d are opened in the first interlayer insulating film 51 on the source electrode 2c and the storage capacitor wiring 41.

Next, as shown in FIG. 2(c), the data wiring 6 is formed by depositing a Ti film to approximately 30 nm in thickness and a Mo film to approximately 300 nm in this order and patterning them. Simultaneously with the formation of this data wiring 6, the island-like electrode 61 is formed at the contact hole 51b for contacting the ITO of the pixel electrode 7 and the source electrode 2c of the TFT. Similarly, the second storage capacitor electrode 62 connected to the storage capacitor wiring 41 via the contact hole 51d is formed.

Next, as shown in FIG. 2(d), the second interlayer insulating film 52 is formed by depositing a SiN film to approximately 300 nm in thickness. Then, the contact hole 52c is opened in the second interlayer insulating film 52 on the island-like electrode 61. After that, the pixel electrode 7 is formed by forming the ITO to approximately 100 nm in thickness and patterning.

By the aforementioned process, a device forming process on the array substrate side of the active matrix type display is completed. Thus, the second storage capacitor Cs2 is formed by the second storage capacitor electrode 62 and the pixel electrode 7 sandwiching the second interlayer insulating film 52, and the first storage capacitor Cs1 is formed by the second storage capacitor electrode 62 and the first storage capacitor electrode 2d sandwiching the first interlayer insulating film 51. As evident from the aforementioned description, the active matrix type display according to this embodiment can be fabricated by using the same device forming materials as in the conventional display and by the same fabrication method as before.

At the end, liquid crystal is filled by laminating the array substrate with the opposing substrate, the liquid crystal is sealed with a predetermined cell gap, a driver IC and the like for driving the liquid crystal is built in and if necessary a back lighting is attached to complete the active matrix type display.

Next, an example of a variation of an active matrix type liquid crystal display according to this embodiment is described with reference to FIG. 3. In a structure shown in FIG. 3, the same code is referred to the same structure element as that shown in FIG. 1 and FIG. 2 and the description is omitted.

When taking a long distance between the gate wiring 4 and the storage capacitor wiring 41 in the structure shown in FIG. 1, it is required to form a first storage capacitor electrode 2d by extending the impurity semiconductor layer from the island-like electrode 61 to the storage capacitor wiring 41. However, since the semiconductor layer shades the light to some extent, drawing around too long distance in the pixel area results in a reduction in aperture ratio of the pixel.

Figure 3:
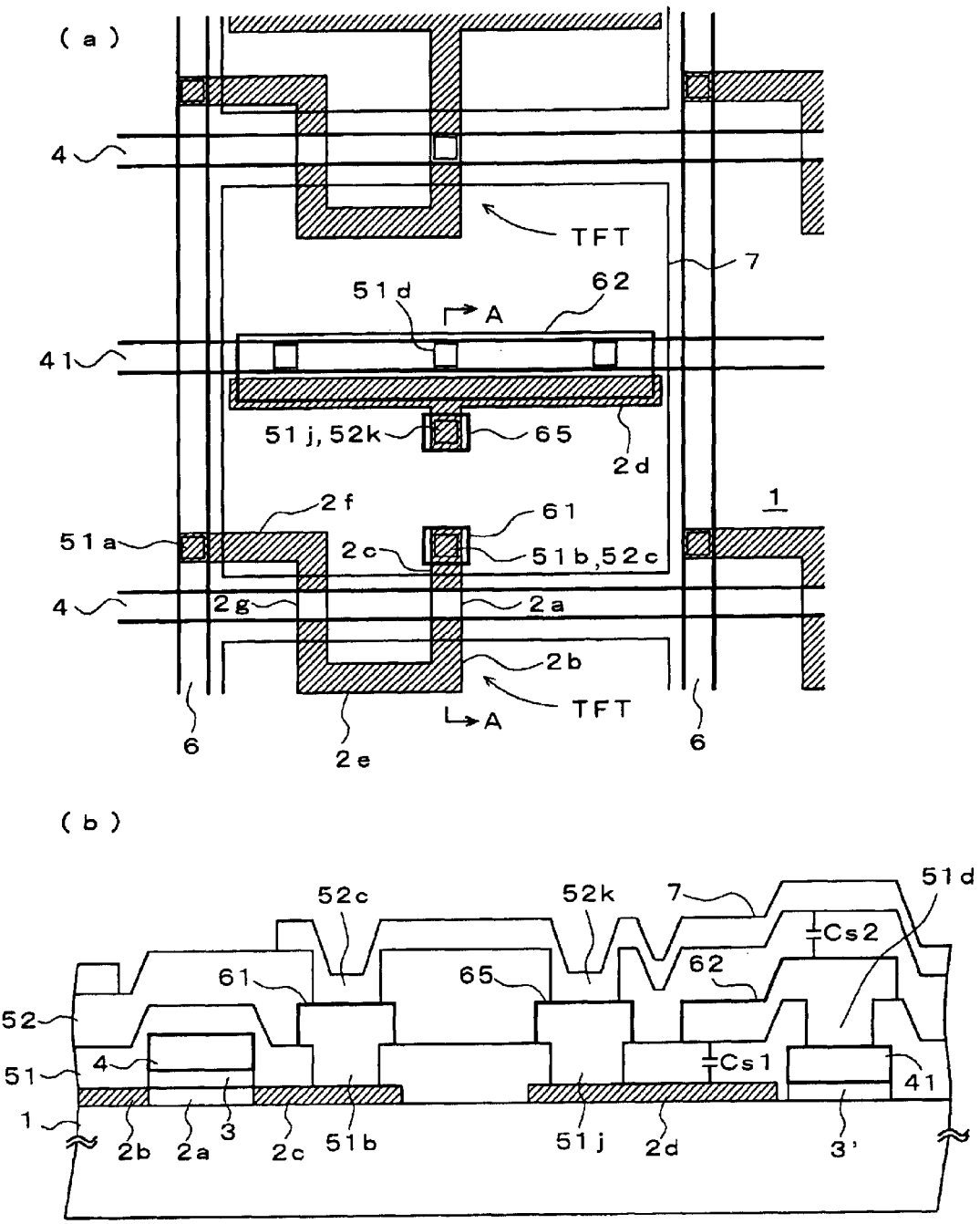
FIG. 3 is a diagram showing another structure of an active matrix type display according to the first embodiment of the present invention.

So, in the structure shown in FIG. 3, the first storage capacitor electrode 2d is separately formed isolated from the source electrode 2c (the first semiconductor layer). Therefore, the first storage capacitor electrode 2d is electrically connected to an island-like electrode 65 via another contact hole 51j formed on the first interlayer insulating film 51. Thus, the island-like electrode 65 is connected to the pixel electrode 7 via a contact hole 52k formed on the second interlayer insulating film 52. It will be noted that an island-like electrode 65 is simultaneously formed when the island-electrode 61 is formed.

According to this structure, the storage capacitance can be increased without a reduction in aperture ratio of the pixel.

Figure 4:
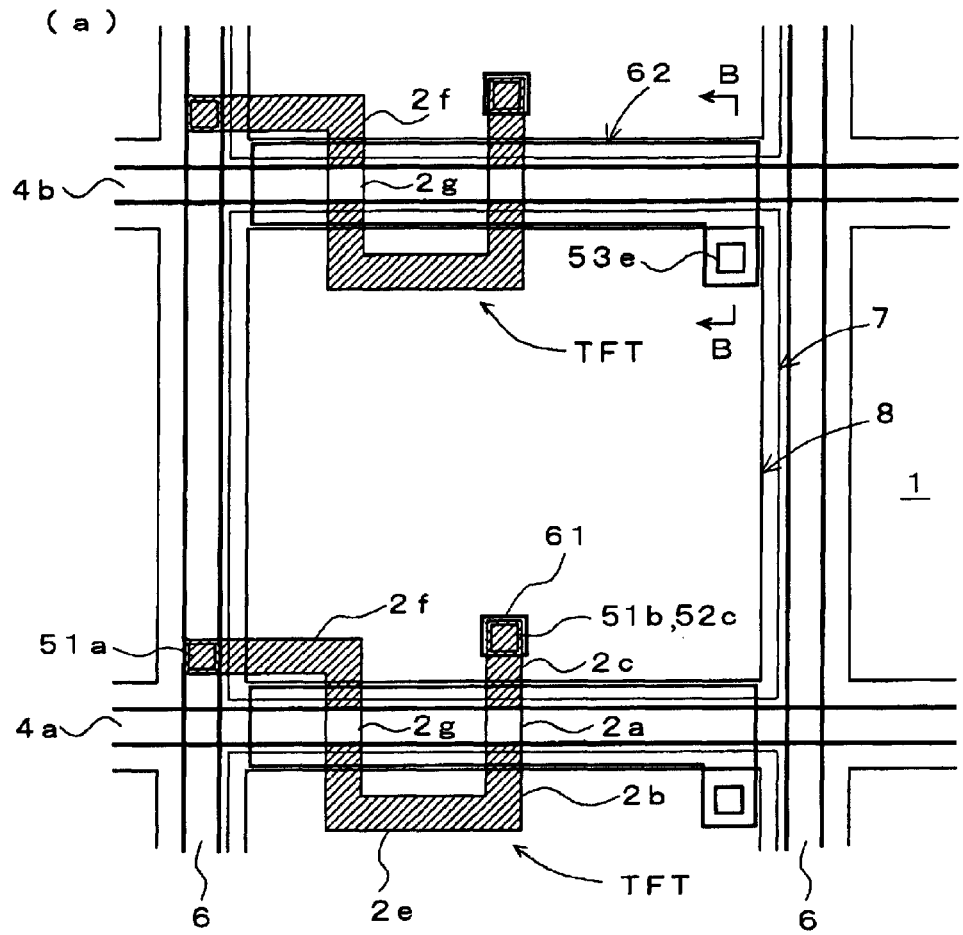
FIG. 4 is a diagram showing a structure of an active matrix type display according to a second embodiment of the present invention.
Figure 4:
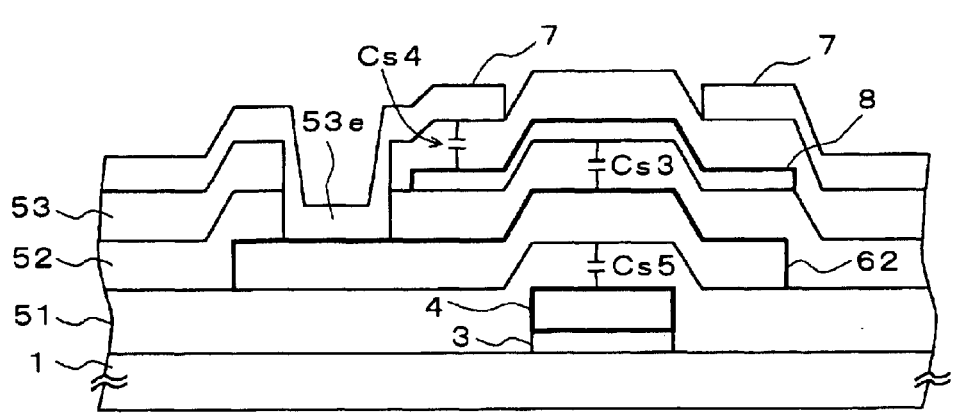
Figure 5:
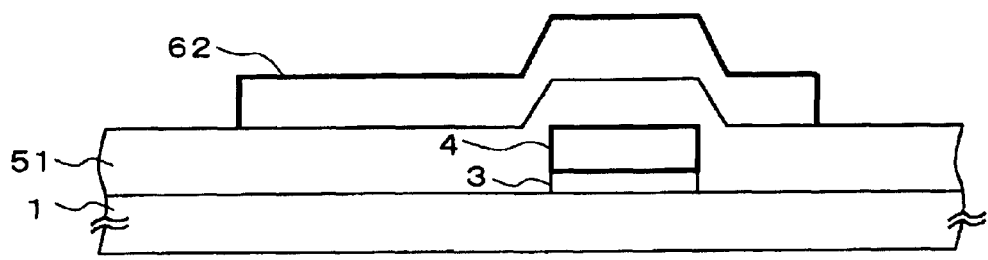
FIG. 5 is a diagram showing a fabrication method of the active matrix type display according to the second embodiment of the present invention.
Figure 5:
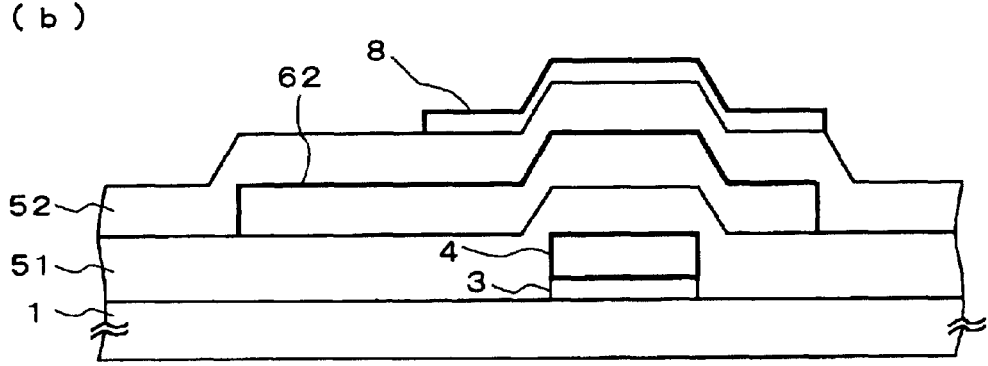
Figure 5:
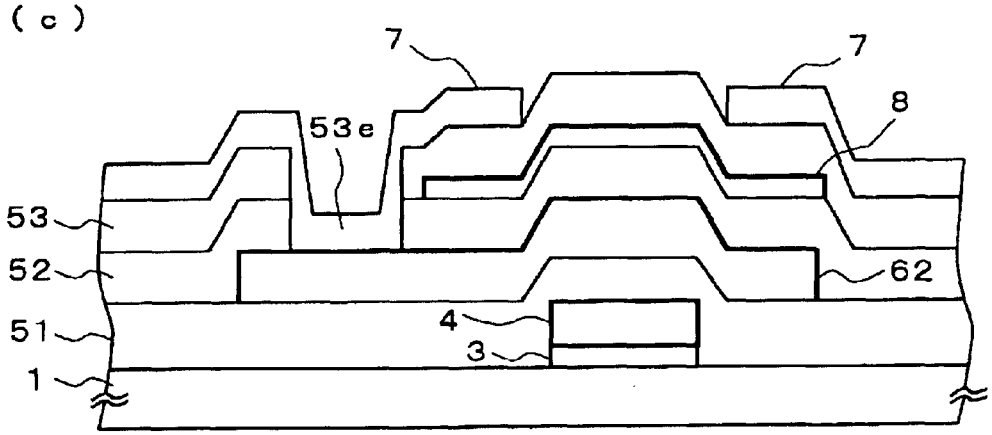
Figure 6:
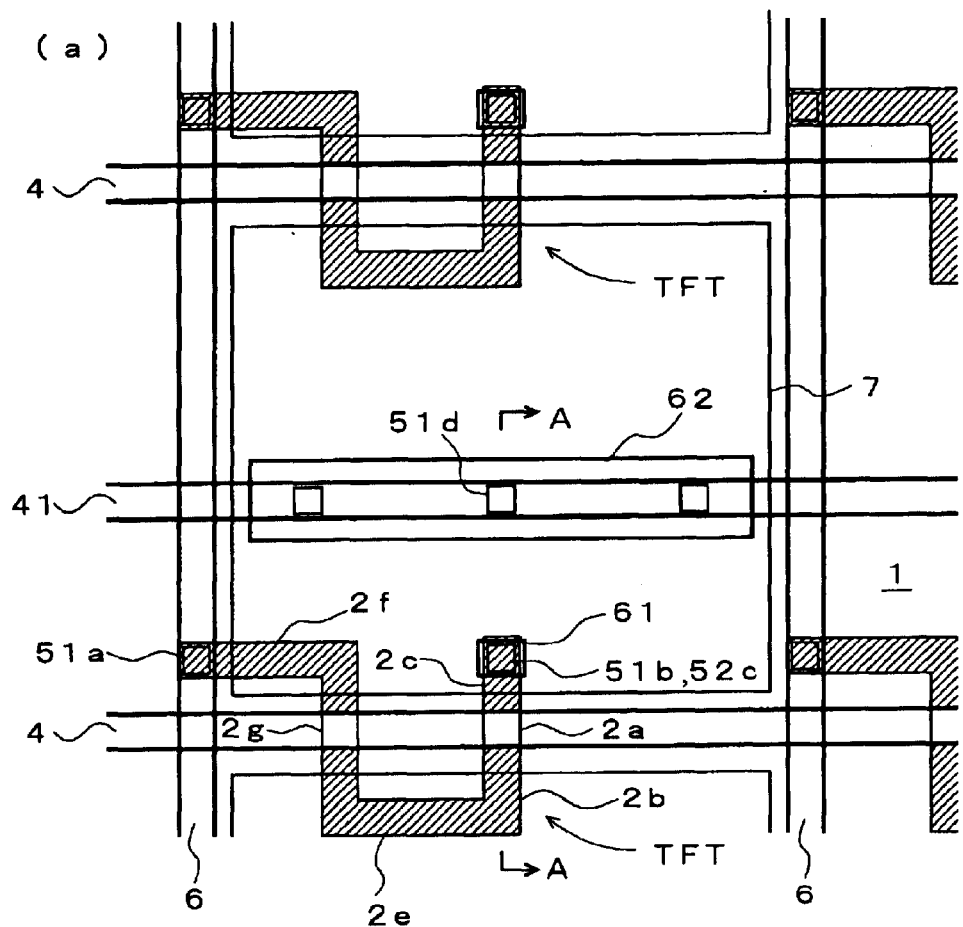
FIG. 6 is a diagram showing a structure of the conventional active matrix type display.
Figure 6:
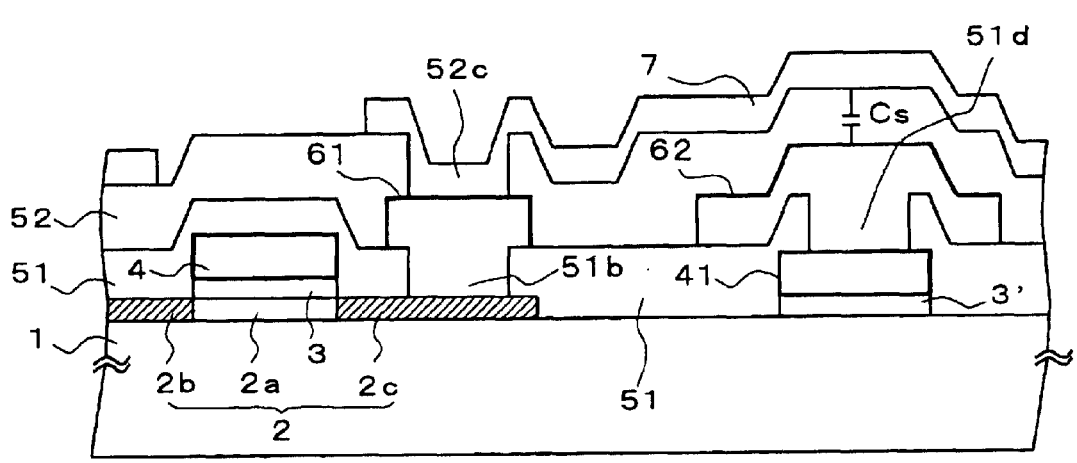
Figure 7:
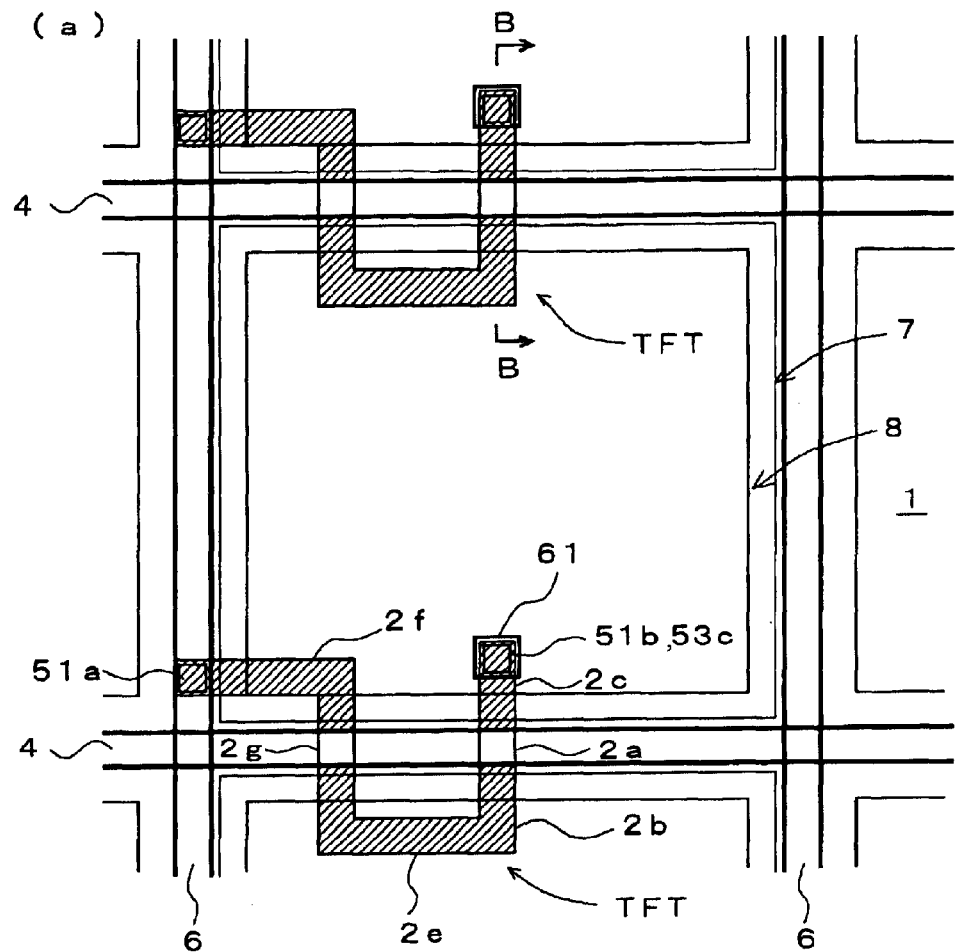
FIG. 7 is a diagram showing other structure of the conventional active matrix type display.
Figure 7:
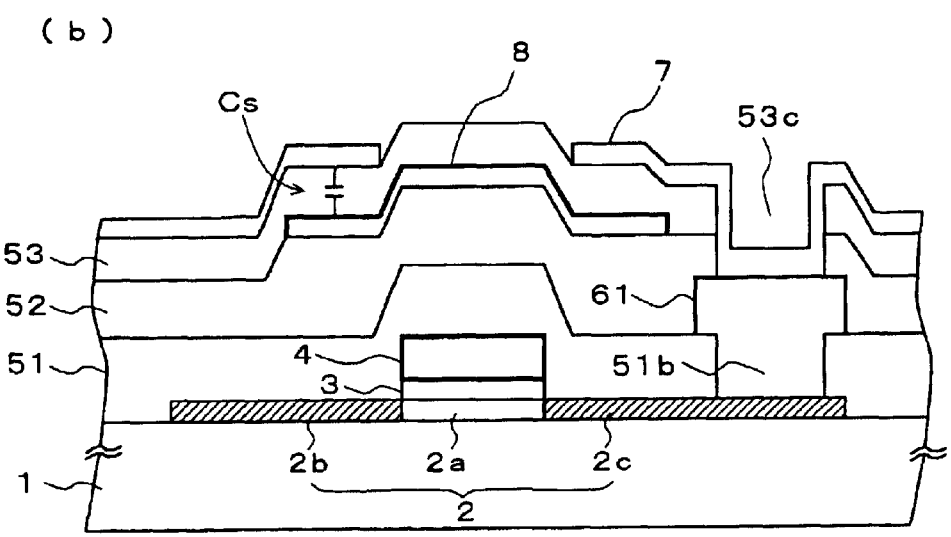

Next, the active matrix type display according to a second embodiment of the present invention is described with reference to FIG. 4 and FIG. 5. First, a schematic structure of the active matrix type display according to this embodiment is described with reference to FIG. 4. FIG. 4(a) shows a plan view of the array substrate and the FIG. 4(b), which is a part of a cross section cut by a line B—B in FIG. 4(a), shows a cross section of the gate wiring 4 area. As shown in FIG. 4(a), on the transparent glass substrate 1, which is to be the array substrate, a plurality of gate wirings 4 (4a, 4b only shown) extending in the lateral direction in the diagram are formed in line in parallel. Further, substantially in the orthogonal direction to the gate wirings 4, a plurality of data wirings 6 are formed in line in parallel. A rectangular-shape area decided by each gate wiring 4 and each data wiring 6 becomes the pixel area and a plurality of pixel areas are arranged in a matrix shape. The TFT is formed in each pixel area. The TFT structure shown in FIG. 4 is the same as the one described with reference to FIG. 1 in the first embodiment and uses a part of the gate wiring 4 wired lineally as the gate electrode. Further, the TFT structure has the so-called double gate structure in which the gate wiring 4 is crossed twice.

In the pixel area, the pixel electrode 7 which has substantially the same outward shape as the outline of the pixel area is formed. The pixel electrode 7 is connected to the source electrode 2c of the TFT at the contact holes 51b and 52c.

In this embodiment, unlike the first embodiment, the impurity semiconductor layer composing the source electrode 2c does not extend and the first storage capacitor electrode 2d is not formed. Instead, a fourth storage capacitor electrode 8 which also serves as a storage capacitor wiring is formed. The fourth storage capacitor electrode 8 has a peripheral area overlapping a perimeter area of the pixel electrode 7 via a third interlayer insulating film 53 when observing from a direction perpendicular to the substrate. Further, the fourth storage capacitor electrode 8 also serves as a black matrix layer normally formed on the opposing substrate side which faces the array substrate, on which the TFT is formed, sandwiching the liquid crystal layer. The black matrix layer is so as not to leak back lighting light from an area where the pixel electrode 7 is not formed. In a high fine display panel and the like having a small area for one pixel, forming the black matrix layer on the array substrate side is particularly effective in preventing a transmitting light out of the back lighting from reducing due to an error in laminating panel alignment between the opposing substrate and the array substrate. Furthermore, a third storage capacitor electrode 62 is formed below the fourth storage capacitor electrode 8 via an insulating film.

Here, further description follows with reference to FIG. 4(a) as well as FIG. 4(b). The third storage capacitor electrode 62 according to this embodiment is formed on the first interlayer insulating film 51 formed above the gate wiring 4. The second interlayer insulating film 52 is formed on the third storage capacitor electrode 62 and the fourth storage capacitor electrode 8 is placed above the second interlayer insulating film 52. The third interlayer insulating film 53 is formed on the fourth storage capacitor electrode 8. The pixel electrode 7 made of ITO and the like is formed on the third interlayer insulating film 53 in each pixel area.

As shown in FIG. 4(a), a part of the third storage capacitor electrode 62 on the gate wiring 4b is pulled out and connected to the pixel electrode 7 via a contact hole 53e in which the pixel electrode 7 is connected to the TFT driven by a gate signal running to the gate next wiring 4a.

In such a structure, a third storage capacitor Cs3 is composed of the third storage capacitor electrode 62, the second interlayer insulating film 52, and the fourth storage capacitor electrode 8. A fourth storage capacitor Cs4 is composed of the fourth storage capacitor electrode 8, the third interlayer insulating film 53, and the pixel electrode 7. Further, a fifth storage capacitor Cs5 is composed of the third storage capacitor electrode 62, the first interlayer insulating film 51, and the gate wiring 4 (4b). It will be noted that the fourth storage capacitor electrode 8 is maintained at the common potential by, for example, being connected to the common electrode in order to keep the predetermined potential.

In the aforementioned structure, since the third storage capacitor electrode 62 and the pixel electrode 7 are electrically connected via the contact hole 53e, the third storage capacitor Cs3 and the fourth storage capacitor Cs4 are connected in parallel. Further, though one side of the electrode forming the fifth storage capacitor Cs5 is an adjacent gate electrode 4b, its gate potential varies only during an extremely short period when the gate signal is written, and is at the predetermined potential at most of other time. During this period when the potential is constant, one side of the fifth storage capacitor Cs5 is used as the storage capacitor electrode. Therefore, since the third through fifth storage capacitors Cs3 through Cs5 can be regarded as being connected in parallel, whole storage capacitance is substantially equal to Cs3+Cs4+Cs5. Further, since the third storage capacitor electrode 62 is positioned to be hidden behind the fourth storage capacitor electrode 8 against the back lighting light, the third storage capacitor electrode 62, excluding a part contacted with the pixel electrode 7, does not prevent the transmitting light in the pixel area.

As described above, according to this embodiment, in addition to the fourth storage capacitor Cs4 which is also formed in the conventional structure, by creating a three-layer structure laminating the third and the fifth storage capacitors Cs3 and Cs5 in the area where light is shielded by fourth storage capacitor electrode 8, the light shielding area at the contact hole 53e at the third storage capacitor electrode 62 and the pixel electrode 7 can only be slightly increased, thereby largely increasing the storage capacity.

Next, a fabrication method of the active matrix type display according to this embodiment is described with reference to FIG. 5. FIG. 5 is a cross sectional view showing a process to form the same area as the cross section shown in FIG. 4(b).

First, on the glass substrate 1 which is a transparent insulating substrate, the semiconductor layer 2 made of, for example, polysilicon is formed to approximately 40 nm in thickness and patterned. Then, as shown in FIG. 5(a), for example, $SiO_2$ is deposited to approximately 100 nm in thickness on a whole surface. Next, by depositing, for example, Cr to 200 nm in thickness and patterning, the gate insulating film 3 and the gate electrode 4 are formed.

Next, implantation of the impurity is performed by using the gate electrode 4 as a mask and the source electrode 2c and the drain electrode 2b of the TFT are formed by self-alignment (not shown). Then, the first interlayer insulating film 51 is formed by depositing, for example, a silicon nitride film (SiN) to, for example, 300 nm in thickness.

Next, the data wiring 6 is formed by depositing the Ti film to approximately 30 nm in thickness and the Mo film to approximately 300 nm in thickness in this order and patterning them (not shown). Simultaneously with the formation of this data wiring 6, the island-like electrode 61 and the like for contacting the pixel electrode 7 with the source electrode 2c of the TFT is also formed (not shown). In the same way, the third storage capacitor electrode 62 is formed on the gate wiring 4 via the first interlayer insulating film 51.

Next, as shown in FIG. 5(b), the second interlayer insulating film 52 is formed by depositing a SiN film to approximately 400 nm in thickness. Then, the fourth storage capacitor electrode 8 also serving as the black matrix layer is formed by depositing a Ti film to, for example, 200 nm in thickness on the second interlayer insulating film 52 and patterning.

Then, as shown in FIG. 5(c), the third interlayer insulating film 53 made of a SiN film of, for example, 400 nm in thickness is formed and the contact hole 53e is opened on the third storage capacitor electrode 62 by passing through the third and the second interlayer insulating films 53 and 52. Further, the pixel electrode 7 is formed by forming the ITO to, for example, 100 nm in thickness and patterning.

By the aforementioned processes, a device forming process on the array substrate side of the active matrix type display is completed. By this completion, the third storage capacitor Cs3 is formed by the third storage capacitor electrode 62, the second interlayer insulating film 52 and the fourth storage capacitor electrode 8, and the fourth storage capacitor Cs4 is formed by the fourth storage capacitor electrode 8, the third interlayer insulating film 53 and the pixel electrode 7. Further, the fifth storage capacitor Cs5 is formed by the third storage capacitor electrode 62, the first interlayer insulating film 51 and the gate wiring 4 (4b). As evident from the aforementioned description, the active matrix type display according to this embodiment can be fabricated by using the same device forming materials as in the conventional display and by the same fabrication method as before.

At the end, the liquid crystal is filled by laminating the array substrate with the opposing substrate, the liquid crystal is sealed with the predetermined cell gap, a driver IC and the like for driving the liquid crystal is built in, and if necessary the back lighting is attached to complete the active matrix type display.

The present invention is not limited to the above embodiment and various variations are possible. For example, though the planer-type TFT is used to describe in the above embodiment, the present invention can be applied to the TFT having a staggered or an inverted staggered structure.

Furthermore, though the second embodiment above is described by using the structure in which the fourth storage capacitor electrode 8 also serves as the storage capacitor wiring, the present invention is not limited to this and the structure can certainly be structured so that the fourth storage capacitor electrode 8 and the storage capacitor wiring are separately established and are electrically connected.

As described above, according to the present invention, capacitance can be increased by laminating storage capacitors without increasing the area for the storage capacitors toward a display area. Therefore, a bright display having a sufficient storage capacitance and a large area as well which transmits the back lighting light can be provided. By having the sufficient storage capacitance, variations of the optimum common potential due to the capacitance between the gate and the pixel can be suppressed and dot defects due to off-leak current of the TFT can also be prevented. Further, the array substrate for the TFT according to the present invention can be fabricated by the same fabrication method using the same device forming materials as before.

What is claimed is:

1. An active matrix type display comprising:

a plurality of gate wirings formed on a substrate;

a plurality of data wirings formed on the substrate substantially orthogonal to the gate wirings;

a plurality of pixel electrodes formed in a plurality of pixel areas decided by the gate wirings and the data wirings and arranged in a matrix shape;

a thin film transistor formed in each of the pixel areas and structured planar type having an operating semiconductor layer formed on the substrate, a gate insulating film formed on the operating semiconductor layer, a gate electrode formed on the gate insulating film and connected to one of the gate wirings, first and second semiconductor layers having impurity formed on both sides of the operating semiconductor layer, a source electrode including the first semiconductor layer electrically connected to the pixel electrode via a contact window opened to first and second insulating layers laminated on the first semiconductor layer and the gate electrode; and a plurality of storage capacitor electrodes using the first semiconductor layer as a first storage capacitor electrode, having a second storage capacitor electrode made of the same layer as the data wirings and sandwiched between the first insulating film and the second insulating film and connected to a storage capacitor wiring maintained at a predetermined potential, wherein at least a first storage capacitor is structured by the first storage capacitor electrode, the first insulating film and the second storage capacitor electrode, and a second storage capacitor is structured by the second storage capacitor electrode, the second insulating film and the pixel electrode.

2. An active matrix type display comprising:

a plurality of gate wirings formed on a substrate;

a plurality of data wirings formed on the substrate substantially orthogonal to the gate wirings;

a plurality of pixel electrodes formed in a plurality of pixel areas decided by the gate wirings and the data wirings and arranged in a matrix shape;

a thin film transistor formed in each of the pixel areas and structured planar type having an operating semiconductor layer formed on the substrate, a gate insulating film formed on the operating semiconductor layer, a gate electrode formed on the gate insulating film and connected to one of the gate wirings, first and second semiconductor layers having impurity formed on both sides of the operating semiconductor layer, a source electrode including the first semiconductor layer electrically connected to the pixel electrode via a contact window opened to first and second insulating layers laminated on the first semiconductor and the gate electrode;

an impurity semiconductor layer formed isolated from the first semiconductor layer on the substrate and made of the same material as the first semiconductor layer; and a plurality of storage capacitor electrodes using the impurity semiconductor layer as a first storage capacitor electrode, having a second storage capacitor electrode made of the same layer as the data wirings and sandwiched between the first insulating film and the second insulating film and connected to a storage capacitor wiring maintained at a predetermined potential, wherein at least a first storage capacitor is structured by the first storage capacitor electrode, the first insulating film and the second storage capacitor electrode, and a second storage capacitor is structured by the second storage capacitor electrode, the second insulating film and the pixel electrode.

3. An active matrix type display comprising:

a plurality of gate wirings formed on a substrate;

a plurality of data wirings formed on the substrate substantially orthogonal to the gate wirings;

a first, a second and a third insulating film formed on the gate wirings;

a pixel electrode formed in a pixel decided by the gate wirings and the data wirings;

a thin film transistor formed in the pixel and having a gate electrode connected to one of the gate wirings, a source electrode connected to the pixel electrode, and a drain electrode connected to the data wirings;

a first storage capacitor electrode formed between the first insulating film and the second insulating film in an area of the gate wiring for previous pixel to the pixel and connected to the pixel electrode; and a second storage capacitor electrode also serving as a storage capacitor wiring formed between the second insulating film and the third insulating film in the area of the gate wiring, and having a peripheral area overlapping a an entire perimeter area of the pixel electrode when observing from a direction perpendicular to the substrate;

wherein a first storage capacitor is structured by the first storage capacitor electrode, the second insulating film and the second storage capacitor electrode, and a second storage capacitor is structured by the second storage capacitor electrode, the third insulating film and the pixel electrode.

4. An active matrix type display as set forth in claim 3, wherein a third storage capacitor is structured by the first storage capacitor electrode, the first insulating film and the gate wiring.

5. An active matrix type display as set forth in claim 3, wherein the second storage capacitor electrode also serves as a shading film.

* * * * *